US009889944B2

(12) United States Patent
Schmidt

(10) Patent No.: US 9,889,944 B2
(45) Date of Patent: Feb. 13, 2018

(54) MULTI-ENGINE AIRCRAFT THRUST BALANCING

(71) Applicant: UNITED TECHNOLOGIES CORPORATION, Hartford, CT (US)

(72) Inventor: Philip A. Schmidt, West Hartford, CT (US)

(73) Assignee: United Technologies Corporation, Farmington, CT (US)

(*) Notice: Subject to any disclaimer, the term of this patent is extended or adjusted under 35 U.S.C. 154(b) by 0 days.

(21) Appl. No.: 14/913,449

(22) PCT Filed: Aug. 27, 2014

(86) PCT No.: PCT/US2014/052847
§ 371 (c)(1),
(2) Date: Feb. 22, 2016

(87) PCT Pub. No.: WO2015/076888
PCT Pub. Date: May 28, 2015

(65) Prior Publication Data
US 2016/0214731 A1 Jul. 28, 2016

Related U.S. Application Data

(60) Provisional application No. 61/870,806, filed on Aug. 28, 2013.

(51) Int. Cl.
B64D 31/12 (2006.01)
F02C 9/42 (2006.01)
(Continued)

(52) U.S. Cl.
CPC .............. B64D 31/12 (2013.01); B64C 13/16 (2013.01); B64D 31/06 (2013.01); B64D 31/10 (2013.01);
(Continued)

(58) Field of Classification Search
CPC ........ B64D 31/12; B64D 31/06; B64D 45/00; G05D 1/0005; G05D 1/0202;
(Continued)

(56) References Cited

U.S. PATENT DOCUMENTS 3,600,888 A 8/1971 Nethken et al.
4,038,526 A * 7/1977 Eccles .................... B64D 31/12
60/39.15
(Continued)

FOREIGN PATENT DOCUMENTS

FR 2945513 A1 * 11/2010 ........... G05D 1/0202
WO 2012148398 11/2012

OTHER PUBLICATIONS

Erkelens, Louis J.J. et al., "Advanced noise abatement for approach and departure", AIAA Guidance, Navigation, and Control Conference and Exhibit Aug. 5-8, 2002, Monterey, California, Paper AIAA 2002-4858, 9 pages.*

(Continued)

Primary Examiner — Behrang Badii
Assistant Examiner — David A Testardi
(74) Attorney, Agent, or Firm — Carlson, Gaskey & Olds, P.C.

(57) ABSTRACT

An aircraft controller includes a memory for storing instructions. The instructions are operable to cause the controller to perform a thrust balancing method and ensure a balanced thrust output from the aircraft. The thrust balancing method includes comparing an aircraft control surface setting in a cruise flight mode with the aircraft control surface setting in a flight idle mode of operations, thereby isolating an asymmetric thrust component of the aircraft control surface settings and determining an asymmetric thrust bias based on the isolated asymmetric thrust component of the aircraft control surface settings.

10 Claims, 3 Drawing Sheets

(51) Int. Cl.
   G05D 1/00     (2006.01)
   B64D 31/06    (2006.01)
   B64C 13/16    (2006.01)
   B64D 31/10    (2006.01)
(52) U.S. Cl.
   CPC .............. *F02C 9/42* (2013.01); *G05D 1/0005* (2013.01); *G05D 1/0072* (2013.01); *Y02T 50/44* (2013.01)
(58) Field of Classification Search
   CPC .. G05D 1/0204; G05D 1/0206; G05D 1/0808; F02C 9/42; B64C 13/16
   See application file for complete search history.

(56) References Cited

U.S. PATENT DOCUMENTS

| | | | | |
|---|---|---|---|---|
| 4,410,948 | A | * | 10/1983 | Doniger ................. G05D 13/66 701/100 |
| 4,648,569 | A | | 3/1987 | Stewart |
| 4,787,201 | A | * | 11/1988 | Snow ...................... B64C 15/02 244/52 |
| 4,875,168 | A | | 10/1989 | Martin |
| 4,947,096 | A | * | 8/1990 | Snow ...................... B64C 15/02 244/76 J |
| 5,001,644 | A | * | 3/1991 | Goheen ..................... F02C 9/42 60/224 |
| 5,006,993 | A | * | 4/1991 | Virnig ..................... F02C 9/42 60/39.281 |
| 5,008,825 | A | * | 4/1991 | Nadkarni ............. G05D 1/0202 244/178 |
| 5,034,895 | A | * | 7/1991 | Johnson ............... G05D 1/0206 114/144 RE |
| 5,060,889 | A | * | 10/1991 | Nadkarni ............. G05D 1/0204 244/183 |
| 5,070,458 | A | * | 12/1991 | Gilmore ............... G05D 1/0005 244/180 |
| 5,123,331 | A | * | 6/1992 | Hirai .................... G05D 1/0825 91/363 A |
| 5,133,182 | A | | 7/1992 | Marcos |
| 5,299,765 | A | | 4/1994 | Blechen |
| 5,330,131 | A | * | 7/1994 | Burcham ................ B64C 15/02 244/182 |
| 5,908,176 | A | * | 6/1999 | Gilyard .................. B64C 13/18 244/130 |
| 6,041,273 | A | * | 3/2000 | Burken .................. B64D 31/06 244/12.4 |
| 6,102,330 | A | * | 8/2000 | Burken ................. G05D 1/0808 244/184 |
| 6,282,466 | B1 | | 8/2001 | Nolte et al. |
| 7,082,767 | B2 | | 8/2006 | Guillot-Salomon et al. |
| 7,100,868 | B2 | * | 9/2006 | Stephan .................. B64C 11/50 244/53 R |
| 8,290,683 | B2 | | 10/2012 | Luppold |
| 8,352,099 | B1 | * | 1/2013 | Eggold ................... B64C 15/02 244/75.1 |
| 8,918,235 | B1 | * | 12/2014 | Eggold ................... B64C 15/02 244/12.4 |
| 2004/0004135 | A1 | * | 1/2004 | Hamamatsu ......... G05D 1/0206 239/265.19 |
| 2004/0232281 | A1 | | 11/2004 | Stephan |
| 2010/0125378 | A1 | * | 5/2010 | Blechen ................ B64D 31/08 701/3 |
| 2010/0241331 | A1 | | 9/2010 | Duke et al. |
| 2010/0241332 | A1 | * | 9/2010 | Andrieu ................ B64D 31/04 701/100 |
| 2010/0292872 | A1 | * | 11/2010 | Ezerzere .............. G05D 1/0202 701/9 |
| 2011/0046823 | A1 | * | 2/2011 | Ezerzere .............. G05D 1/0202 701/4 |
| 2011/0202251 | A1 | * | 8/2011 | Luppold .................. F02C 9/42 701/100 |

OTHER PUBLICATIONS

Gilyard, Glen, "In-flight transport performance optimization-an experimental flight research program and an operational scenario", Proceedings of the 16th AIAA/IEEE Digital Avionics Systems Conference, Reflections to the Future, 16th DASC, 1997, pp. 7.2-33-7.2-49 vol. 2.*
Umes Sr., Jim, "Integrated flight propulsion control applications", 3rd NASA GRC Propulsion Controls and Diagnostics Workshop Feb. 28-Mar. 1, 2012, Cleveland, Ohio, 25 pages.*
PPRuNe Forums, Fly a Boeing? Why is right rudder trim needed in cruise?, Apr. 2, 2013, 8 pages, downloaded from: http://www.pprune.org/archive/index.php/t-511632.html.*
The Straight Dope (Message Board), "How do you land a plane in a crosswind?", Nov. 17, 2006, 9 pages, downloaded from: http://boards.straightdope.com/sdmb/archive/index.php/t-396755.html.*
Windfinder, "Amsterdam-Schiphol Airport", retrieved Jul. 26, 2017, 2 pages, downloaded from: https://www.windfinder.com/windstatistics/amsterdam-schiphol.*
International Preliminary Report on Patentability for Application No. PCT/US2014/052847 dated Mar. 10, 2016.
International Search Report and Written Opinion for Application No. PCT/US2014/052847 dated Jun. 11, 2015.
The Extended European Search Report for EP Application No. 14864691.2, dated Apr. 25, 2017.

* cited by examiner

MULTI-ENGINE AIRCRAFT THRUST BALANCING

CROSS-REFERENCE TO RELATED APPLICATION

This application claims priority to U.S. Provisional Application No. 61/870,806 filed on Aug. 28, 2013.

TECHNICAL FIELD

The present disclosure relates generally to multi-engine aircraft, and more particularly to a thrust balancing system for the same.

BACKGROUND OF THE INVENTION

Multi-engine aircraft, such as passenger jets, operate in multiple modes during any given flight, with the majority of the flight spent in a cruise mode. Because of uneven wear and/or uneven age of the aircraft engines, the actual thrust output of each of the engines can vary even when conventional thrust metrics such as Engine Pressure Ratio (EPR) and Low Rotor Speed (N1) indicate approximately identical thrust outputs.

During cruise mode, if the multiple engines are outputting uneven (non-symmetrical) thrust, aircraft control surfaces are used to maintain a correct aircraft heading, and ensure that the aircraft does not go off course. Continuously operating the aircraft with asymmetric thrust and aircraft control surface corrections results in a decrease in fuel efficiency of the aircraft and an increase in the fuel costs for any given flight.

SUMMARY OF THE INVENTION

An aircraft controller according to an embodiment of this disclosure, among other possible things includes a non-transient storage medium, the non transient storage medium storing instructions operable to cause the controller to perform the steps of, comparing an aircraft control surface setting in a cruise flight mode with the aircraft control surface setting in a flight idle mode of operations, thereby isolating an asymmetric thrust component of the aircraft surface settings, and determining an asymmetric thrust bias based on the isolated asymmetric thrust component of the aircraft surface settings.

In a further embodiment of the foregoing aircraft controller, the non-transient storage medium further stores instructions for causing the controller to perform the step of determining the aircraft control surface setting in the cruise flight mode of operations by determining a running average of the aircraft control surface setting in the cruise flight mode over at least a portion of the cruise flight mode of operations.

In a further embodiment of the foregoing aircraft controller, the non-transient storage medium further stores instructions for causing the controller to perform the step of determining the aircraft control surface setting in the cruise flight mode of operations by determining an instantaneous aircraft control surface setting as the aircraft exits the cruise mode of operations and enters a pre-landing procedure.

In a further embodiment of the foregoing aircraft controller, the non-transient storage medium further stores instructions for causing the controller to perform the step of determining the aircraft control surface setting in the flight idle mode of operations by determining an instantaneous aircraft control surface setting as the aircraft enters the flight idle mode of operations.

In a further embodiment of the foregoing aircraft controller, the aircraft control surface setting is an aircraft control surface deflection.

In a further embodiment of the foregoing aircraft controller, the aircraft control surface is a rudder.

In a further embodiment of the foregoing aircraft controller, the step of comparing the aircraft control surface setting in the cruise flight mode with the aircraft control surface setting in the flight idle mode of operations further includes subtracting a variable dependent on the aircraft control surface setting in the flight idle mode of operations from the aircraft control surface setting in the cruise flight mode.

In a further embodiment of the foregoing aircraft controller, the step of determining an asymmetric thrust bias based on the isolated asymmetric thrust component of the aircraft surface settings further includes determining a thrust differential between a plurality of engines on a multi-engine aircraft required to necessitate the asymmetric thrust component of the aircraft surface settings.

An aircraft controller according to an embodiment of this disclosure, among other possible things includes a non-transient storage medium, the non-transient storage medium storing instructions operable to cause the controller to perform the step of applying at least one asymmetric thrust bias determined in a previous flight to a thrust balancing system of a multi-engine aircraft, thereby accounting for engine discrepancies.

In a further embodiment of the foregoing aircraft controller, the non-transient storage medium further stores instructions for causing the controller to perform the step of determining an average asymmetric thrust bias of a plurality of previous flights and the step of applying at least one asymmetric thrust bias determined in a previous flight to a thrust balancing system of the multi-engine aircraft comprises applying the average asymmetric thrust bias.

In a further embodiment of the foregoing aircraft controller, the average asymmetric thrust bias is a weighted average, thereby accounting for anomalous flight conditions.

In a further embodiment of the foregoing aircraft controller, the non-transient storage medium further stores instructions for causing the controller to perform the step of disabling a thrust balancing system during at least one of landing procedures and take off procedures.

In a further embodiment of the foregoing aircraft controller, the step of applying at least one asymmetric thrust bias determined in a previous flight to a thrust balancing system of the multi-engine aircraft, thereby accounting for engine discrepancies is performed during at least one of pre-flight procedures, take off, and transition to a cruise mode of operations.

In a further embodiment of the foregoing aircraft controller, the non-transient storage medium stores instructions for causing the controller to perform the step of determining a thrust metric of each of the engines on the multi-engine aircraft, applying a thrust balancing value based on the asymmetric thrust bias to the thrust metric of at least one of the engines, thereby generating an adjusted thrust metric accounting for engine discrepancies, and adjusting a thrust of at least one of the engines based on the adjusted thrust metric. As is understood in the art, the thrust produced by an aircraft engine is controlled via an aircraft controller. The output signal of the aircraft controller utilized to control the amount of thrust produced by a given engine is referred to herein as a "thrust output control signal".

In a further embodiment of the foregoing aircraft controller, the thrust metric is at least one of an engine pressure ratio (EPR) and a low rotor fan speed (N1).

A multi-engine aircraft according to an exemplary embodiment of this disclosure, among other possible things includes a plurality of engines, at least one of the engines mounted to a first wing of the aircraft and at least one of the engines mounted to a second wing of the aircraft, an aircraft control surface operable to adjust a heading of the aircraft, and an aircraft controller operable to control a deflection of the aircraft control surface, the aircraft controller including a memory storing instructions for causing the aircraft controller to perform a thrust balancing method including the steps of comparing an aircraft control surface setting in a cruise flight mode with the aircraft control surface setting in a flight idle mode of operations, thereby isolating an asymmetric thrust component of the aircraft surface settings, and determining an asymmetric thrust bias based on the isolated asymmetric thrust component of the aircraft surface settings.

In a further embodiment of the foregoing multi-engine aircraft, the aircraft control surface is an aircraft rudder.

In a further embodiment of the foregoing multi-engine aircraft, includes a sensor located at the aircraft control surface and connected to the aircraft controller, such that the sensor can transmit the aircraft control surface deflection to the aircraft controller.

These and other features of the present invention can be best understood from the following specification and drawings, the following of which is a brief description.

DETAILED DESCRIPTION OF AN EMBODIMENT

Figure 1:
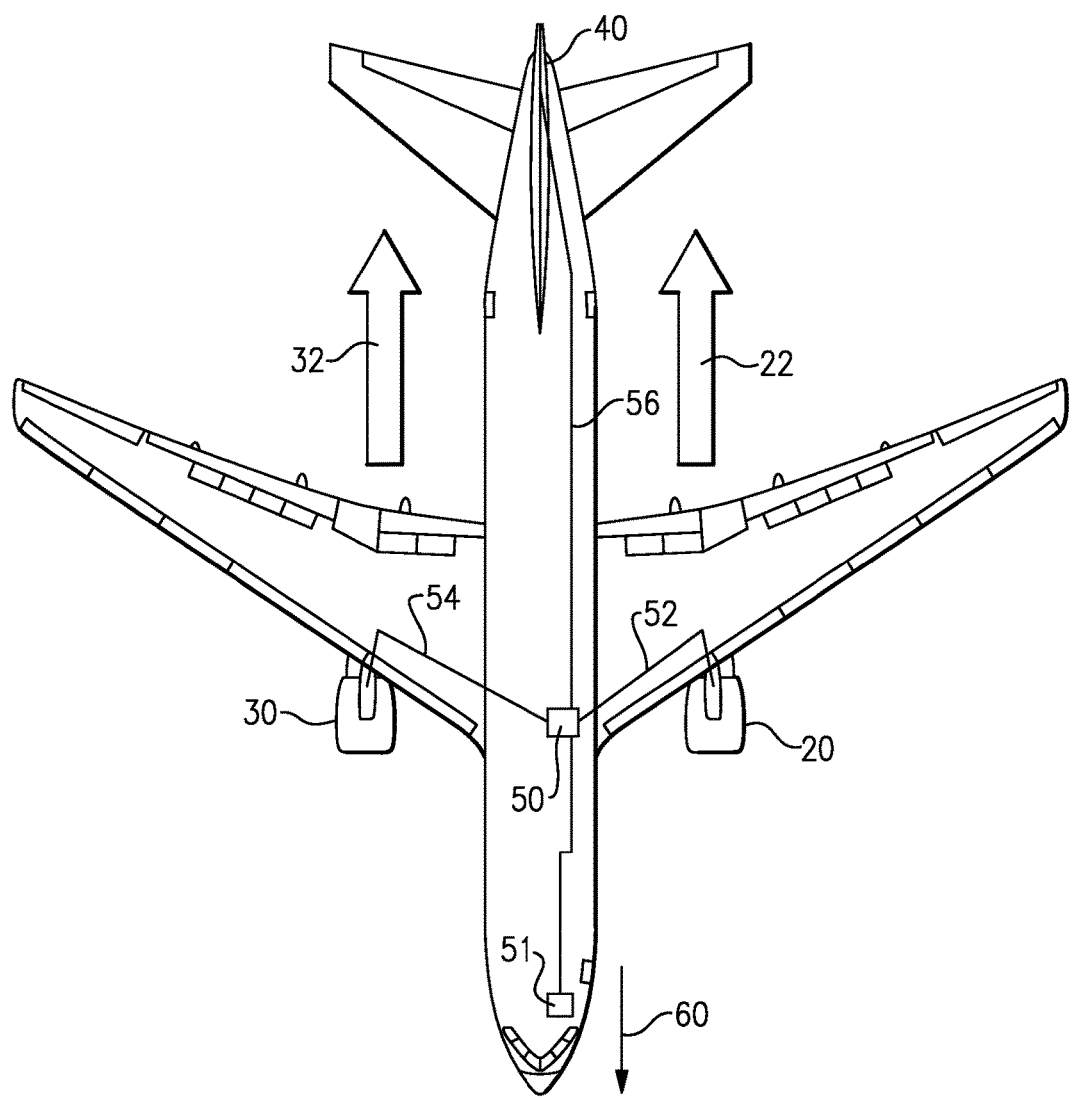
FIG. 1 illustrates an example multi-engine aircraft with symmetrical engine thrusts.

FIG. 1 schematically illustrates a multi-engine aircraft 10 including a first turbine engine 20 and a second turbine engine 30. The aircraft includes a control surface 40, such as a rudder, that maintains a heading 60 of the aircraft 10 during flight. Each of the engines 20, 30 outputs a certain amount of thrust 22, 32 which propels the aircraft forward and cooperates with the wing design to generate lift, lifting the aircraft. A controller 50 is connected to each of the engines 20, 30 via engine control lines 52, 54 and to the aircraft control surface 40 via a control surface control line 56. The controller 50 includes a non-transient memory for storing control instructions. The aircraft 10 also includes a flight deck computer 51 that is connected to the controller 50, and is operable to provide heading information and other flight information from the flight deck 51 to the controller 50.

During standard flight conditions the balanced thrust 22, 32 produced by the engines 20, 30 maintains the aircraft heading 60 in a forward direction while requiring minimal actuation of the aircraft control surface 40. The engine thrusts are typically balanced using either a measured engine pressure ratio (EPR) or a measured low rotor fan speed (N1) to approximate the thrust generated by the engines. EPR and N1 are referred to in the art as "thrust metrics".

When the thrust metrics of each engine 20, 30 are the same, it is generally assumed that the output thrust 22, 32 is approximately the same between the two engines 20, 30. It is known in the art that the currently used thrust metrics do not reflect the actual thrust produced, but provide an approximation of the thrust produced. In identical engines 20, 30, an identical thrust metric will generate identical thrust.

On multi-engine aircraft, such as the aircraft 10 illustrated in FIG. 1, often at least one older engine 30 and one newer engine 20 are included on the aircraft for safety purposes. As a result of the different ages and wear on the engines 20, 30, the existing thrust metrics (EPR, N1) do not result in identical thrusts with identical thrust metric values in the practical implementation.

Figure 2:
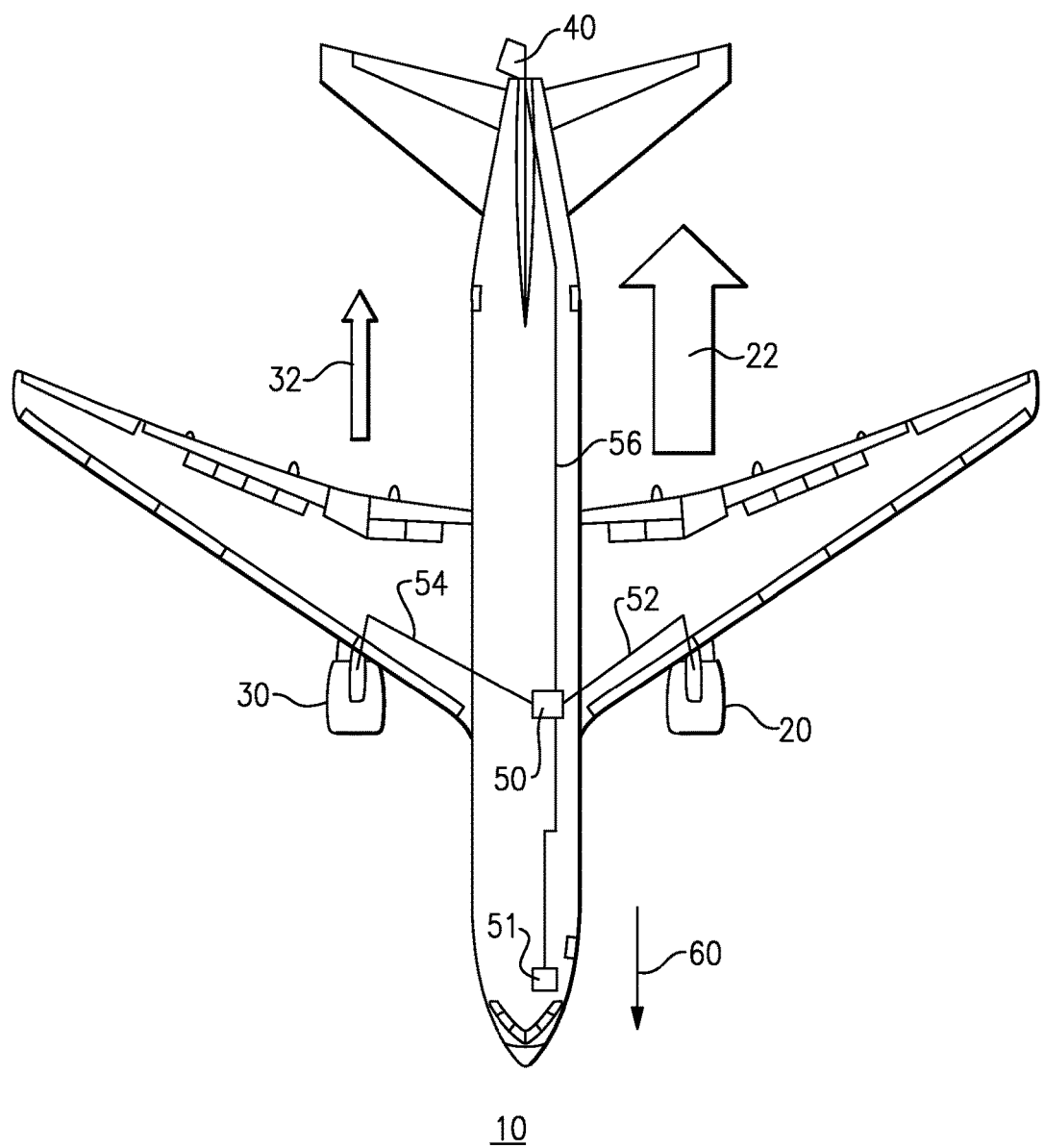
FIG. 2 illustrates an example multi-engine aircraft with asymmetrical engine thrusts.

With continued reference to FIG. 1 and with like numerals indicating like elements, FIG. 2 illustrates an example multi-engine aircraft 10 including a newer engine 20 and an older engine 30. The older engine 30 includes more wear on the engine components, and produces a smaller amount of thrust 32 than the newer engine 20 at the same thrust metric as a result of the wear. The difference between the thrust produced on each side of the aircraft 10 is referred to as asymmetric thrust. In alternate examples the older engine 30 may produce a larger amount of thrust at the same thrust metric.

As a result of the asymmetric thrust, the engine control surface 40 is deflected in order to maintain the aircraft 10 on the correct heading 60. The deflection introduces, additional drag on the aircraft and the fuel efficiency of the aircraft 10 is negatively impacted. A typical aircraft flight spends over 80% of the engine operation time in cruise operations, where the fuel efficiency loss is notable, and correctible.

At the end of the flight, as the aircraft 10 begins its pre-landing procedures, the aircraft 10 enters a flight idle operations mode. During the flight idle operations mode, the thrust produced by the engines is reduced to a relatively low amount compared with other modes of operations during the flight. As the aircraft transitions into the flight idle mode of operations, the controller 50 measures the change in settings of the aircraft control surface 40 required to maintain the aircraft on its proper heading 60. The settings (amount of deflection) of the aircraft control surface 40 in flight idle mode approximate the settings required to maintain the heading 60 as a result of environmental factors not including the thrusts 22, 32 produced by the engines 20, 30. By way of example, the environmental factors can be a wind direction, a wind speed, turbulence levels, etc. that vary as the aircraft changes altitude levels.

By comparing the settings of the aircraft control surface 40 in flight idle mode against the settings of the aircraft control surface 40 in cruise mode, the amount of aircraft control surface 40 deflection required to compensate for the thrust differences of the aircraft engines 20, 30 can be determined. In some examples, the heading information provided by an aircraft flight controller is included in the comparison, thereby accounting for a turn immediately prior to, or during, a landing procedure. This value is referred to as an asymmetric thrust bias. This determination is then used by an on-board computer, controller (such as the controller 50), or any other computerized aircraft component to determine asymmetric thrust values of the engines 20, 30 and provide corrected thrust settings in future aircraft flights, thereby recognizing an increase in fuel efficiency. In examples where the heading information indicates a significant turn, the flight data may be invalidated within the controller due to the crosswind change as a result of the heading change.

Figure 3:
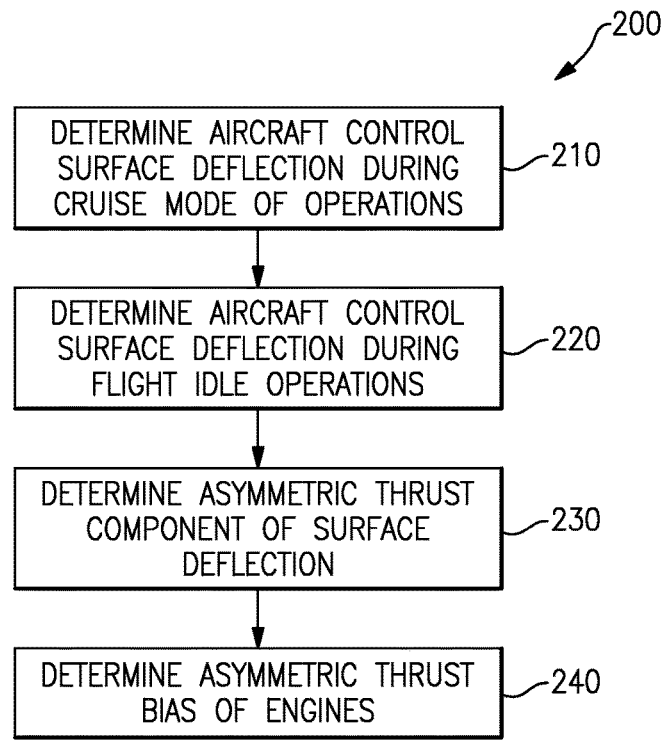
FIG. 3 illustrates a flowchart of a method for determining an asymmetric thrust bias of a multi-engine aircraft.

FIG. 3 illustrates a method 200 for determining an asymmetric thrust bias of a multi-engine aircraft utilizing the above described feature. Initially, at Step 210, during the standard cruise engine operations of an aircraft flight, a controller 50 or other computerized aircraft component determines the deflection of an aircraft control surface such as an aircraft rudder. In one example this determination is made immediately before the aircraft exits the cruise mode of operations and enters flight idle operations. This transition occurs typically during pre-landing procedures, however it is understood that the transition can occur at other points during a flight as well. In alternate examples, the determination can be made at other points during the cruise mode of operations or as a running average over the duration of the engine's cruise mode.

Then, at Step 220, when the aircraft engines enter a flight idle mode of operations, the controller 50 or other computerized aircraft component again determines the aircraft control surface deflection. In some examples, the aircraft control surface deflection is measured once the aircraft has fully entered the flight idle mode. In alternate examples, the aircraft control surface deflection is measured over time as the aircraft enters the flight idle mode, and the change in aircraft control surface deflection indicates what the flight idle aircraft control surface deflection will be.

In the case of both the previously described steps 210, 220, the aircraft control surface deflection can be determined either based on the control outputs generated by the controller 50 and passed to the aircraft control surface or by an additional sensor located at the aircraft control surface and operable to measure the deflection of the aircraft control surface. Alternately, other known methods of determining the aircraft control surface deflection can be utilized to the same effect.

Then, at Step 230, when both the flight idle and the cruise mode aircraft control surface deflection are determined, the controller 50 or other computerized aircraft component compares the determined aircraft control surface deflections relative to each other and isolates a component of the control surface deflection during cruise mode operations that is the result of asymmetric engine thrusts. In some examples, this isolation is done by subtracting a variable dependent upon the surface deflection at flight idle mode from the surface deflection in the cruise operations mode, and the asymmetric thrust deflection is the remainder.

Then, at Step 240, once the amount of surface deflection of the aircraft control surface is determined, the computerized control system utilizes the asymmetric thrust component of the control surface deflection to determine an asymmetric thrust bias of each of the engines. The asymmetric thrust bias of the engines represents the actual amount of thrust produced by each engine relative to the actual thrust produced by the other engines at a near identical thrust metric such as EPR or N1.

As the flight idle mode of operations is typically entered into as the aircraft prepares to enter landing procedures, the cruise portion of the flight is typically over before the asymmetric thrust bias is determined for a particular flight. Thus, the asymmetric thrust bias is stored in an aircraft memory, and applied in future flights. In this way also, the aircraft 10 can update the aircraft thrust bias after each flight, and maintain a more accurate engine balancing system than existing thrust balancing systems.

Once the asymmetric thrust bias of the engines for a particular flight has been determined, the aircraft 10 can utilize the asymmetric thrust bias to correct for the asymmetric thrust during future cruise operations.

Figure 4:
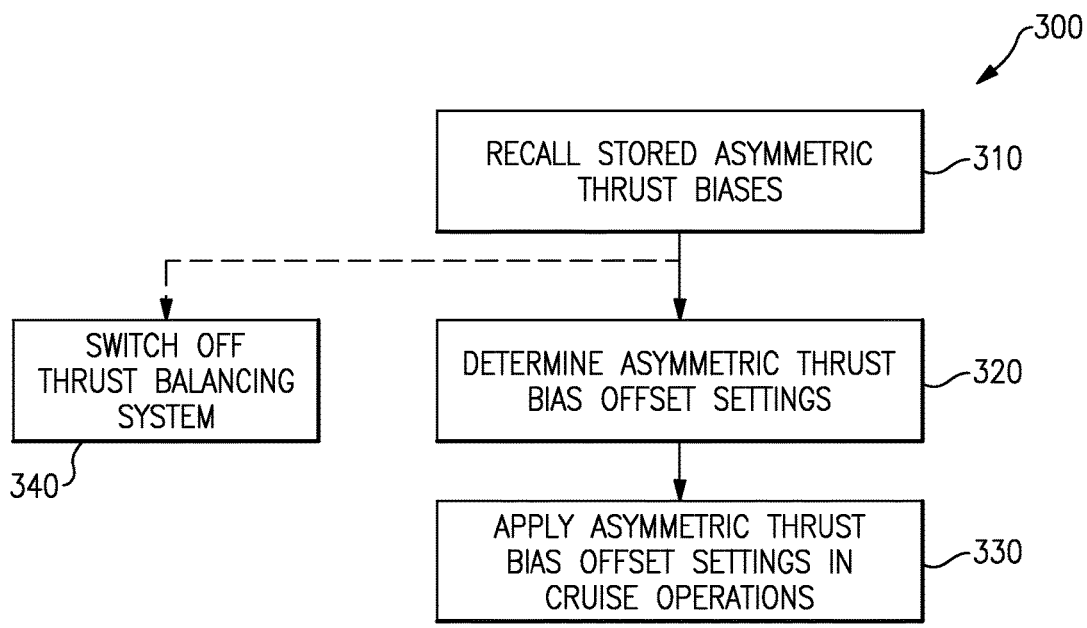
FIG. 4 illustrates a flowchart of a thrust balancing method for a multi-engine craft.

FIG. 4 illustrates a method 300 of utilizing previously determined asymmetric thrust data to balance engine thrusts 22, 32 on a multi-engine aircraft 10. At Step 310, at the beginning of a flight, or during pre-flight procedures, the controller 50 or another computerized aircraft component initially recalls stored asymmetric thrust data from previous flights. In some example systems, the controller 50 only recalls the asymmetric thrust bias data from the most recent previous flight. In alternate example systems, the controller 50 can recall stored asymmetric thrust bias data from multiple previous flights, and utilize a running average of the asymmetric thrust bias data or a weighted average of the asymmetric thrust bias data.

In one example, the running average is a flat mean average of the asymmetric thrust bias data for a set number of immediately prior flights. Utilizing the running average allows the controller 50 to minimize the impact of anomalous environmental conditions or engine conditions, while still providing an improved thrust balancing system.

Similarly, in one example the weighted average is a mean average of the asymmetric thrust bias data for a set number of immediately prior flights, with a weighting value applied to each flight. In this way a controller 50 can account for particularly strong cross winds during the transition to flight idle operations by giving a particular flight's asymmetric thrust bias data a low weight, such as 0.1. Similarly, the controller 50 can account for particularly weak cross winds by assigning a high weight, such as 1.9, to a particular flight's asymmetric thrust bias data when the flight had particularly low cross winds during the transition to flight idle operations. In this way the controller 50 can actively account for particularly anomalous situations. The weighting value is a multiplicative value applied to the asymmetric thrust bias data and increases or decreases the weight of a particular flight's data within a set of multiple of flights.

In yet another alternate example of the process of FIG. 4, the controller 50 can discard asymmetric thrust bias data from a flight when that flight is too anomalous. The discarding of the data can either be through an automated process, based on flight conditions detected by the aircraft systems, or a manual system where an employee, aircraft technician, or ground based computer system manually removes the anomalous flight data.

At Step 320, once the stored asymmetric thrust biases are recalled, the controller 50 determines the appropriate asymmetric thrust bias offset settings. That is, during this step, the controller 50 determines an actual bias offset value to apply to each engine. The bias offset value offsets the thrust metrics (EPR or N1) seen by the controller 50 to account for the bias determined in the previous flights. The bias offset values are determined for each engine relative to each other engine on the aircraft.

Once the bias offset value for each engine has been determined, the bias offset value is stored for later use. Then, at Step 330, when the aircraft 10 enters the cruise mode of operations, the controller 50 applies the bias offset values determined in Step 320 to the aircraft engine controls. By applying the thrust bias offsets to the engine controls, the controller 50 offsets the detected thrust metric of at least one of the engines 20, 30 being used to balance the engine thrusts, and generate symmetric thrust from the engine, thereby minimizing the aircraft control surface deflection required to maintain a heading, and increasing the fuel efficiency of the aircraft during cruise operations.

While the method 300 of utilizing previously determined asymmetric thrust data to balance engine thrusts 22, 32 is described above as being initiated at the beginning of a flight, it is further understood that the method 300 could alternately be performed once the aircraft 10 reaches cruise altitude, or by the aircraft 10 during its ascent.

Furthermore, while the above describe method is described generally with regards to a twin engine aircraft 10, such as the aircraft illustrated in FIGS. 1 and 2, it is understood that the methods and devices described herein can be applied to multi-engine aircraft including any number of engines on each side of the aircraft.

In yet another example, the asymmetric thrust biasing system can be suspended or switched off at step 340 during takeoff and landing procedure in order to provide enhanced control to the pilot. The asymmetric thrust balancing system can similarly be suspended or switched off at step 340 during any operation in which enhanced pilot control is desired.

It is further understood that any of the above described concepts can be used alone or in combination with any or all of the other above described concepts. Although an embodiment of this invention has been disclosed, a worker of ordinary skill in this art would recognize that certain modifications would come within the scope of this invention. For that reason, the following claims should be studied to determine the true scope and content of this invention.

The invention claimed is:

1. An aircraft controller comprising:
a non-transient storage medium, the non-transient storage medium storing instructions operable to cause the controller to perform the steps of:
determining a setting of an aircraft control surface while in a flight idle mode of operations by determining an instantaneous setting of the aircraft control surface as the aircraft enters the flight idle mode of operations;
comparing a setting of the aircraft control surface while in a cruise flight mode of the aircraft with the setting of the aircraft control surface while in the flight idle mode of operations of the aircraft, thereby isolating an asymmetric thrust component of the settings of the aircraft control surface;
determining an asymmetric thrust bias based on the isolated asymmetric thrust component of the settings of the aircraft control surface; and
adjusting a thrust output control signal, thereby compensating for the determined asymmetric thrust bias.

2. The aircraft controller of claim 1, wherein the non-transient storage medium further stores instructions for causing the controller to perform the step of determining the setting of the aircraft control surface while in the cruise flight mode of operations by determining a running average of the setting of the aircraft control surface while in the cruise flight mode over at least a portion of the cruise flight mode of operations.

3. The aircraft controller of claim 1, wherein the non-transient storage medium further stores instructions for causing the controller to perform the step of determining the setting of the aircraft control surface while in the cruise flight mode of operations by determining an instantaneous setting of the aircraft control surface as the aircraft exits the cruise mode of operations and enters a pre-landing procedure.

4. The aircraft controller of claim 1, wherein the setting of the aircraft control surface is an aircraft control surface deflection.

5. The aircraft controller of claim 1, wherein the aircraft control surface is a rudder.

6. The aircraft controller of claim 1, wherein the step of comparing the setting of the aircraft control surface while in the cruise flight mode with the setting of the aircraft control surface while in the flight idle mode of operations further comprises subtracting a variable dependent upon the setting of the aircraft control surface while in the flight idle mode of operations from the setting of the aircraft control surface while in the cruise flight mode.

7. The aircraft controller of claim 1, wherein the step of determining an asymmetric thrust bias based on the isolated asymmetric thrust component of the settings of the aircraft control surface further comprises determining a thrust differential between a plurality of engines on a multi-engine aircraft required to necessitate the asymmetric thrust component of the settings of the aircraft control surface.

8. A multi-engine aircraft comprising:
a plurality of engines, at least one of the engines mounted to a first wing of the aircraft and at least one of the engines mounted to a second wing of the aircraft;
an aircraft control surface operable to adjust a heading of the aircraft; and
an aircraft controller operable to control a deflection of the aircraft control surface, the aircraft controller including a memory storing instructions for causing the aircraft controller to perform a thrust balancing method including the steps of:
determining a flight idle mode setting of the aircraft control surface while in the flight idle mode of operations by determining an instantaneous setting of the aircraft control surface as the aircraft enters the flight idle mode of operations;
determining a cruise mode setting of the aircraft control surface while the aircraft is in the cruise mode of operations;
comparing the cruise mode setting of the aircraft control surface with the flight idle mode setting of the aircraft control surface, thereby isolating an asymmetric thrust component of the settings of the aircraft control surface; and
determining an asymmetric thrust bias based on the isolated asymmetric thrust component of the settings of the aircraft control surface.

9. The multi-engine aircraft of claim 8, wherein the aircraft control surface is an aircraft rudder.

10. The multi-engine aircraft of claim 8, further comprising a sensor located at the aircraft control surface and connected to the aircraft controller, such that the sensor can transmit the aircraft control surface deflection to the aircraft controller.

* * * * *